United States Patent
Pajukoski et al.

(10) Patent No.: US 8,320,395 B2
(45) Date of Patent: Nov. 27, 2012

(54) REDUCED INTERFERENCE CHANNEL ALLOCATION BASED ON SUBBAND GROUPING BY MODULATION, CODING, AND POWER

(75) Inventors: Kari Pajukoski, Oulu (FI); Esa Tiirola, Oulu (FI); Kari Horneman, Oulu (FI)

(73) Assignee: Nokia Corporation, Espoo (FI)

( * ) Notice: Subject to any disclaimer, the term of this patent is extended or adjusted under 35 U.S.C. 154(b) by 497 days.

(21) Appl. No.: 11/396,538

(22) Filed: Apr. 4, 2006

(65) Prior Publication Data

US 2007/0171809 A1    Jul. 26, 2007

(30) Foreign Application Priority Data

May 6, 2005 (FI) .................................. 20055211

(51) Int. Cl.
H04W 72/00 (2009.01)
H04W 72/08 (2009.01)
H04J 11/00 (2006.01)
H04B 7/204 (2006.01)

(52) U.S. Cl. ........ 370/431; 370/208; 370/319; 455/450; 455/452.2

(58) Field of Classification Search .................. 370/208, 370/319, 431; 455/450, 451, 452.1, 452.2
See application file for complete search history.

(56) References Cited

U.S. PATENT DOCUMENTS

| | | | |
|---|---|---|---|
| 5,915,221 A | 6/1999 | Sawyer et al. | |
| 6,028,851 A | 2/2000 | Persson et al. | |
| 6,246,877 B1 | 6/2001 | Frodigh et al. | |
| 6,272,348 B1 | 8/2001 | Saario et al. | |
| 6,498,934 B1 | 12/2002 | Muller | |
| 6,636,736 B1 | 10/2003 | Billon | |
| 6,671,516 B1 | 12/2003 | Doi | |
| 6,993,342 B2 | 1/2006 | Kuchibhotla et al. | |
| 7,184,773 B2 | 2/2007 | Nagai et al. | |
| 7,636,334 B2 | 12/2009 | Gerlach | |
| 7,680,457 B2 | 3/2010 | Jin et al. | |
| 2001/0053695 A1 | 12/2001 | Wallentin | |
| 2003/0013451 A1 | 1/2003 | Walton | |
| 2003/0096618 A1 | 5/2003 | Palenius | |
| 2003/0123425 A1 | 7/2003 | Walton et al. | |
| 2003/0128658 A1 * | 7/2003 | Walton et al. | 370/208 |

(Continued)

FOREIGN PATENT DOCUMENTS

EP    0680168 A2    11/1995

(Continued)

OTHER PUBLICATIONS

Office Action for Japanese Application No. 2008-509463 dated Jun. 4, 2010.

(Continued)

Primary Examiner — Jean Gelin
Assistant Examiner — Tangela T. Chambers
(74) Attorney, Agent, or Firm — Alston & Bird LLP

(57) ABSTRACT

A radio resource control in an Uplink Frequency Division Multiple Access (FDMA) system is provided. The control procedure includes: dividing the common frequency band into more than one frequency band sub-block; allocating at least one user terminal to each frequency band sub-block on the basis of the modulation and coding schemes used by the user terminals; and controlling transmission power of the user terminals on the basis of the modulation and coding schemes used by the user terminals.

28 Claims, 4 Drawing Sheets

U.S. PATENT DOCUMENTS

| | | | | |
|---|---|---|---|---|
| 2004/0062193 | A1* | 4/2004 | Ma et al. | 370/208 |
| 2004/0100897 | A1* | 5/2004 | Shattil | 370/206 |
| 2004/0106410 | A1 | 6/2004 | Choi et al. | |
| 2005/0002369 | A1* | 1/2005 | Ro et al. | 370/208 |
| 2005/0009532 | A1 | 1/2005 | Cuffaro et al. | |
| 2005/0025039 | A1* | 2/2005 | Hwang et al. | 370/206 |
| 2005/0025040 | A1* | 2/2005 | Tang et al. | 370/208 |
| 2005/0031047 | A1* | 2/2005 | Maltsev et al. | 370/207 |
| 2005/0096061 | A1 | 5/2005 | Ji et al. | |
| 2005/0099937 | A1* | 5/2005 | Oh et al. | 370/207 |
| 2005/0157639 | A1* | 7/2005 | Song et al. | 370/208 |
| 2006/0019701 | A1 | 1/2006 | Ji | |
| 2006/0153060 | A1* | 7/2006 | Cho | 370/208 |
| 2006/0205412 | A1 | 9/2006 | Oh et al. | |
| 2006/0211426 | A1 | 9/2006 | Costa et al. | |
| 2006/0251041 | A1 | 11/2006 | Pajukoski et al. | |
| 2007/0171809 | A1 | 7/2007 | Pajukoski et al. | |
| 2007/0297323 | A1* | 12/2007 | Seki | 370/208 |
| 2008/0039129 | A1* | 2/2008 | Li et al. | 455/522 |
| 2008/0132242 | A1 | 6/2008 | Hamalainen et al. | |

FOREIGN PATENT DOCUMENTS

| | | |
|---|---|---|
| EP | 1014640 A2 * | 6/2000 |
| EP | 1526674 A1 | 4/2005 |
| EP | 1 538 802 A2 | 6/2005 |
| EP | 1566918 A1 | 8/2005 |
| EP | 1 589 776 A1 | 10/2005 |
| EP | 1603356 A2 | 12/2005 |
| EP | 1 653 694 A2 | 5/2006 |
| WO | WO 02/49305 A2 | 6/2002 |
| WO | WO 02/067617 A1 | 8/2002 |
| WO | WO 2005/020613 A2 | 3/2005 |
| WO | WO 2005/101882 A1 | 10/2005 |
| WO | WO 2007/107207 A1 | 9/2007 |

OTHER PUBLICATIONS

Non-Final Rejection mailed by the Korean Intellectual Property Office on Aug. 13, 2010, for Korean Patent Application No. 10-2009-7002431.

International Search Report mailed Aug. 1, 2006 for International Patent Application No. PCT/FI2006/050179.

"UL interference control considerations", 3GPP TSG-RAN WG1 Meeting #42, R1-050813, Nokia, Agenda Item: 10.2.2, London, UK, Aug. 29-Sep. 2, 2005, 3 pages.

"System level performance of UL SC-FDMA", 3GPP TSG RAN WG1 Meeting #43, R1-051411, Nokia, Agenda item: 8.4, Seoul, Korea, Nov. 7-11, 2005, 4 pages.

International Search Report and Written Opinion received for corresponding Patent Corporation Treaty Application No. PCT/FI2007/050593, dated Feb. 26, 2008, 11 Pages.

International Search Report and Written Opinion received for corresponding Patent Corporation Treaty Application No. PCT/FI2006/050324, dated on Mar. 23, 2007, 11 Pages.

International Search Report and Written Opinion received for corresponding Patent Corporation Treaty Application No. PCT/FI2007/050010, dated Apr. 17, 2007, 10 Pages.

Office Action received for corresponding Russian Patent Application No. 2009103985, dated Jan. 19, 2010, 7 Pages of Office Action and 4 pages of English Translation.

"UL Reference Signal Structure for E-UTRA", 3GPP TSG RAN WG1 #47, R1-063368, Nokia, Agenda item: 6.4.2, Riga, Latvia, Nov. 6-10, 2006, 4 pages.

"Orthogonal Multiplexing of L1/L2 Control Signals with UL Data", 3GPP TSG RAN WG1 #47, R1-063381, Nokia, Agenda item: 6.12.1, Riga, Latvia, Nov. 6-10, 2006, 2 pages.

"Multiplexing of L1/L2 Control Signaling when UE has no data to transmit", 3GPP TSG RAN WG1 #47, R1-063380, Nokia, Agenda item: 6.12.1, Riga, Latvia, Nov. 6-10, 2006, 6 pages.

"CDM Multiplexing of Synchronous RACH", 3GPP TSG RAN WG1 #47, R1-063361, Nokia, Agenda item: 6.3.1, Riga, Latvia, Nov. 6-10, 2006, 5 pages.

Office Action received for corresponding Japanese Patent Application No. 2008-509463, dated Jun. 14, 2010, 2 Pages of Office Action and 4 pages of English Translation.

Office Action received for corresponding Korean Patent Application No. 2007-7024384, dated Aug. 10, 2009, 3 Pages of Office Action and 2 pages of English Translation.

Office Action received for corresponding Korean Patent Application No. 2007-7024384, dated Jan. 13, 2010, 3 Pages of Office Action and 2 pages of English Translation.

Office Action received for corresponding Malaysian Patent Application No. PI20061872, dated Feb. 20, 2009, 3 pages.

International Search Report and Written Opinion received for corresponding Patent Cooperation Treaty Application No. PCT/FI2006/050179, dated Aug. 1, 2006, 10 Pages.

"Analysis of Inter-cell Power Control for Interference Management in E-UTRA UL", 3GPP TSG-RAN WG1 #46bis, R1-062705, Seoul, Korea, Agenda item: 6.8, Oct. 9-13, 2006, 17 pages.

"ACK/NACK Coverage in the Absence of UL Data", 3GPP TSG RAN WG1 #47, R1-063382, Nokia, Agenda item: 6.12.1, Riga, Latvia, Nov. 6-10, 2006, 4 pages.

Baiocchi et al., "Autonomous optimized interference management of CDMA cellular access with multichannel", 14th 1st Mobile and Wireless Communications Summit, Dresden, Germany, Jun. 19-22, 2005, 5 pages.

International Search Report and Written Opinion received for corresponding Patent Corporation Treaty Application No. PCT/FI2006/050177, dated Aug. 1, 2006, 11 Pages.

Chang et al., "Power Control, Adaptive Modulation and Subchannel Allocation for multiuser downlink OFDM", IEEE 60th Vehicular Technology conference, VTC2004-Fall, Sep. 26-29, 2004, Los Angeles CA, USA, pp. 764-768.

Office Action received for corresponding Malaysian Patent Application No. PI20061352, dated May 8, 2009, 4 pages.

"Power Control and FDM Resource Allocation for E-UTRA Uplink and TP", 3GPP TSG RAN1#43 Ad Hoc, R1-060026 Motorola, Agenda Item: 5.2.3.4, Helsinki, Finland, Jan. 23-25, 2006, 5 Pages.

Office Action received for corresponding Taiwanese Patent Application No. 95115685, dated Feb. 1, 2010, 2 pages.

3GPP Technical Report 25.814 V7.1.0, 3rd Generation Partnership Project; Technical Specification Group Radio Access Network; Physical layer aspects for evolved Universal Terrestrial Radio Access (UTRA), Release 7), Sep. 2006, 132 pages.

International Preliminary Report on Patentability received for corresponding Patent Corporation Treaty Application No. PCT/FI2006/050324, dated on Jan. 13, 2009, 8 Pages.

International Preliminary Report on Patentability received for corresponding Patent Corporation Treaty Application No. PCT/FI2007/050010, dated on Jan. 13, 2009, 7 Pages.

International Preliminary Report on Patentability received for corresponding Patent Corporation Treaty Application No. PCT/FI2006/050177, dated Nov. 6, 2007, 9 Pages.

International Preliminary Report on Patentability received for corresponding Patent Corporation Treaty Application No. PCT/FI2007/050593, dated on May 12, 2009, 9 Pages.

International Preliminary Report on Patentability received for corresponding Patent Corporation Treaty Application No. PCT/FI2006/050179, dated on Nov. 6, 2007, 8 Pages.

Office Action received for corresponding Chinese Patent Application No. 200780030970.4, dated Sep. 6, 2010, 4 pages.

Office Action received for corresponding Chinese Patent Application No. 200780030970.4, dated May 12, 2011, 8 pages.

Office Action received for corresponding Korean Patent Application No. 2009-7002431, dated Aug. 13, 2010, 11 pages.

Office Action received for related Chinese Patent Application No. 200680015507.8, dated Sep. 3, 2010, 3 pages.

Office Action received for related U.S. Appl. No. 11/979,504, dated May 6, 2011, 7 pages.

Office Action received for corresponding U.S. Appl. No. 11/362,706, dated Nov. 13, 2008, 18 pages.

Office Action received for corresponding U.S. Appl. No. 11/362,706, dated Mar. 31, 2010, 14 pages.

Office Action received for corresponding U.S. Appl. No. 11/396,538, dated Sep. 26, 2008, 20 pages.

Office Action received for corresponding U.S. Appl. No. 11/396,538, dated Mar. 19, 2009, 14 pages.

Office Action received for corresponding U.S. Appl. No. 11/396,538, dated Sep. 14, 2009, 13 pages.
Office Action received for corresponding U.S. Appl. No. 11/396,538, dated Apr. 13, 2010, 15 pages.
Office Action received for corresponding U.S. Appl. No. 11/362,706, dated Oct. 1, 2009, 12 pages.
Office Action received for corresponding U.S. Appl. No. 11/362,706, dated May 11, 2009, 13 pages.
Office Action received for related U.S. Appl. No. 11/979,504, dated Feb. 8, 2011, 19 pages.
Office Action for U.S. Appl. No. 12/307,746 dated Mar. 13, 2012.
Office Action for Chinese Application No. 200780030970.4 dated Apr. 1, 2012.
Office Action for U.S. Appl. No. 11/979,504 dated Jun. 7, 2012.
Office Action issued in U.S. Appl. No. 12/307,746, mailed Jul. 6, 2011.
Third Office Action issued in Chinese Patent Application No. 200780030970.4, mailed Aug. 3, 2011.
International Search Report from International Patent Application No. PCT/FI2006/050179, filed May 5, 2006.
Office Action issued in connection with U.S. Appl. No. 11/979,504, mailed Sep. 11, 2012.

* cited by examiner

PRIOR ART

US 8,320,395 B2

REDUCED INTERFERENCE CHANNEL ALLOCATION BASED ON SUBBAND GROUPING BY MODULATION, CODING, AND POWER

FIELD

The invention relates to a method of controlling radio resources in an Uplink Frequency Division Multiple Access system, a wireless telecommunications system supporting an Uplink Frequency Division Multiple Access, a network element, a computer program product encoding a computer program of instructions for executing a computer process for controlling radio resources in an Uplink Frequency Division Multiple Access system, and a computer program distribution medium readable by a computer and encoding a computer program of instructions for executing a computer process for controlling radio resources in an Uplink Frequency Division Multiple Access system.

BACKGROUND

Frequency Division Multiple Access (FDMA) systems and methods are widely used in wireless communication systems. FDMA refers to a wireless communication technique in which a frequency spectrum is divided into a plurality of smaller frequency cells. Each cell of the spectrum has a carrier signal that can be modulated with data. This increases the amount of data that can be communicated over the spectrum, and also provides a mechanism for allocating a bandwidth to service providers.

For example, in the upcoming evolution of 3GPP (3$^{rd}$ Generation Partnership Project) systems, FDMA offers a promising technology for increasing the throughput performance of 3.9G uplink (UL). In an isolated cell, the gain of FDMA over WCDMA is evident. In non-isolated cells, the gain is slightly smaller and depends mainly on the required coverage area probability. An FDMA Uplink can be realized either by using single carrier FDMA (SC-FDMA) or multicarrier OFDMA (Orthogonal FDMA, OFDMA) techniques.

The performance of the uplink of FDMA and OFDMA is sensitive to non-idealities, such as a frequency error and phase noise. Generally, the frequency error is caused by Doppler shift and frequency synchronization errors between uplink and downlink transceivers. In the worst case, the frequency error caused by Doppler effect detected by a base station receiver is two times the maximum Doppler shift.

The problem related to the frequency error is severe in the uplink direction where each terminal has its own local oscillator synchronized with a base stations' local oscillator in a downlink direction. In the synchronizing phase, each terminal sees a different Doppler shift, which is added to the frequency difference between the local oscillators of the terminal and base station. Thus, the base station sees different frequency corrections from different terminals.

The non-idealities produce adjacent channel leakage. This, in turn, causes multiple access interference, which means that different users of FDMA/OFMA system start to interfere each other at the base station receiver. The higher the power differences between the received levels of different users using the adjacent bands, the greater the problem with multiple access interference.

FIG. 1 illustrates the bandwidth usage principle in a known single carrier FDMA system (SC-FDMA). A common frequency band is used by multiple user terminals. The total bandwidth 110 is, for example, 20 MHz. Each user terminal adjusts the carrier frequency and signal bandwidth 100, 102, 104, for example, according to the data rate and signal-to-interference-noise-ratio (SINR). In the SC-FDMA, the problem of multiple access interference is solved by transmit and receive filters and guard bands 106, 108 between the users. The drawback of SC-FDMA is that rather broad guard bands and long guard times are needed, which causes a high overhead. This, in turn, will decrease the spectrum efficiency of the system. The problem is greatest with the narrowest transmission bandwidths.

FIG. 2 illustrates another known way of spectrum utilization in FDMA/OFDMA systems. Users having different modulation and coding schemes (MCS) 1×16QAM⅔ USERs, 2×QPSK½ USERs, 4×QPSK⅙ USERs have been located into the frequency domain such that users having the same MCSs are close to each other and the users having different MCS are far away in the same frequency domain 100. In the receiver side a common filter is used. The problem with this approach is that the users having high received power levels (e.g. 16 QAM, effective code rate=⅔) cause strong interference to other users having low received power levels. The interference problem is more severe if there are frequency errors in the system.

Because of the foregoing reasons it is desirable to consider improvements to radio resource control in Uplink Frequency Division Multiple Access systems.

BRIEF DESCRIPTION OF THE INVENTION

An object of the invention is to provide an improved method, user equipment, wireless telecommunications system, network element, computer program product and computer program distribution medium. According to an aspect of the invention, there is provided a method of controlling radio resources in an Uplink Frequency Division Multiple Access system, where a common frequency band is used by multiple user terminals for communicating with a network infrastructure. The method comprises: dividing the common frequency band into more than one frequency band sub-block; allocating at least one user terminal to each frequency band sub-block on the basis of modulation and coding schemes used by the user terminals; and controlling transmission power of the user terminals on the basis of the modulation and coding schemes used by the user terminals.

According to another aspect of the invention, there is provided a wireless telecommunications system supporting Uplink Frequency Division Multiple Access, where a common frequency band is used by multiple user terminals for communicating with a network infrastructure, the wireless telecommunications system including a network infrastructure and more than one user terminal. The network infrastructure comprises: a processing unit configured to divide the common frequency band into more than one frequency band sub-block, to allocate at least one user terminal to each frequency band sub-block on the basis of the modulation and coding schemes used by the user terminals, and to control transmission power of the user terminals on the basis of the modulation and coding schemes used by the user terminals.

According to another aspect of the invention, there is provided a wireless telecommunications system supporting Uplink Frequency Division Multiple Access, where a common frequency band is used by multiple user terminals for communicating with a network infrastructure, the wireless telecommunications system including a network infrastructure and more than one user terminal. The network infrastructure comprises: dividing means for dividing the common frequency band to more than one frequency band sub-block; radio resource allocation means for allocating at least one user terminal into each frequency band sub-block on the basis of the modulation and coding schemes used by the user terminals; and power control means for controlling transmission power of the user terminals on the basis of the modulation and coding schemes used by the user terminals.

According to another aspect of the invention, there is provided a network element of a wireless telecommunications system supporting Uplink Frequency Division Multiple Access, where a common frequency band is used by multiple user terminals for communicating with a network infrastructure. The network element comprises a processing unit configured to divide the common frequency band into more than one frequency band sub-block, to allocate at least one user terminal into each frequency band sub-block on the basis of the modulation and coding schemes used by the user terminals, and to control transmission power of the user terminals on the basis of the modulation and coding schemes used by the user terminals.

According to another aspect of the invention, there is provided a network element of a wireless telecommunications system supporting Uplink Frequency Division Multiple Access, where a common frequency band is used by multiple user terminals for communicating with a network infrastructure. The network element comprising dividing means for dividing the common frequency band into more than one frequency band sub-block; radio resource allocation means for allocating at least one user terminal into each frequency band sub-block on the basis of the modulation and coding schemes used by the user terminals; and power control means for controlling transmission power of the user terminals on the basis of the modulation and coding schemes used by the user terminals.

According to another aspect of the invention, there is provided a computer program product encoding a computer program of instructions for executing a computer process for controlling radio resources in an Uplink Frequency Division Multiple Access system, where a common frequency band is used by multiple user terminals for communicating with a network infrastructure, the process including: dividing the common frequency band to more than one frequency band sub-block; allocating at least one user terminal into each frequency band sub-block on the basis of the modulation and coding schemes used by the user terminals; and controlling transmission power of the user terminals on the basis of the modulation and coding schemes used by the user terminals.

According to yet another aspect of the invention there is provided a computer program distribution medium readable by a computer and encoding a computer program of instructions for executing a computer process for controlling radio resources in an Uplink Frequency Division Multiple Access system, where a common frequency band is used by multiple user terminals for communicating with a network infrastructure, the process including: dividing the common frequency band to more than one frequency band sub-block; allocating at least one user terminal into each frequency band sub-block on the basis of the modulation and coding schemes used by the user terminals; and controlling transmission power of the user terminals on the basis of the modulation and coding schemes used by the user terminals.

As an advantage, the invention enables a simple method of controlling radio resources in uplink FDMA systems. Interference between the user terminals of the system can be reduced significantly. A rather high difference in the average received power levels of different user terminals in different frequency band sub-blocks can be enabled. Capitalizing the potential of high MCSs is possible without interfering other user terminals too much. The flexibility of the system is increased and the use of optimum radio resources in the system is allowed.

LIST OF DRAWINGS

In the following, the invention will be described in greater detail with reference to the embodiments and the accompanying drawings, in which FIG. 1 illustrates an example of the bandwidth usage principle in a known single carrier FDMA system;

DESCRIPTION OF EMBODIMENTS

Figure 3:
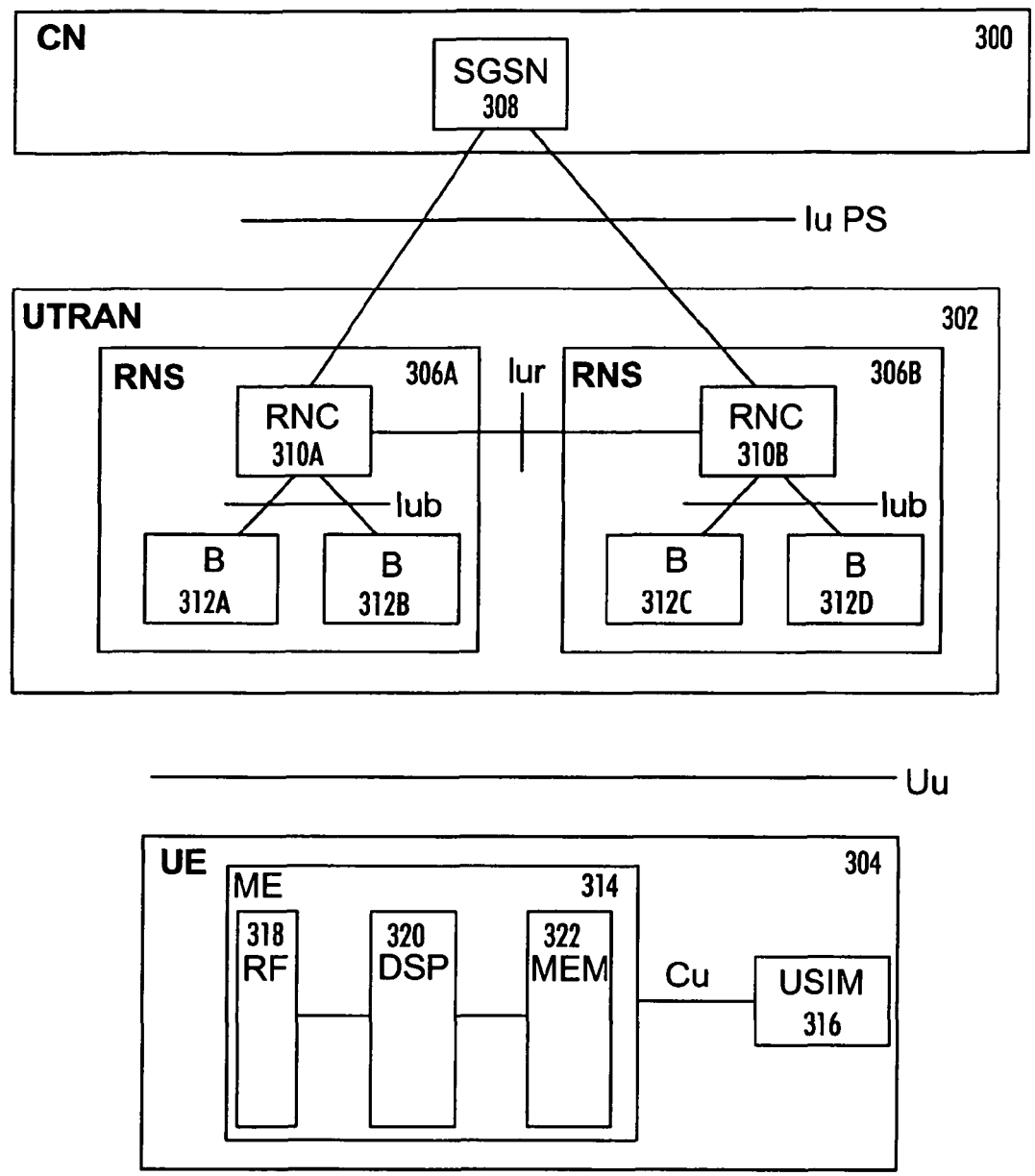
FIG. 3 shows an example of a wireless telecommunications system.

FIG. 3 illustrates an example of a wireless telecommunications system to which the present solution may be applied. Below, embodiments of the invention will be described using the UMTS (Universal Mobile Telecommunications System) as an example of the wireless telecommunications system. The invention may, however, be applied to any wireless telecommunications system that supports FDMA system elements. The structure and functions of such a wireless telecommunications system and those of the associated network elements are only described when relevant to the invention.

The wireless telecommunications system may be divided into a core network (CN) 300, a UMTS terrestrial radio access network (UTRAN) 302, and user terminal (UE) 304. The core network 300 and the UTRAN 302 compose a network infrastructure of the wireless telecommunications system.

The UTRAN 302 is typically implemented with wideband code division multiple access (WCDMA) radio access technology.

The core network 300 includes a serving General Packet Radio Services (GPRS) support node (SGSN) 308 connected to the UTRAN 302 over an Iu PS interface. The SGSN 308 represents the center point of the packet-switched domain of the core network 100. The main task of the SGSN 308 is to transmit packets to the user terminal 304 and to receive packets from the user terminal 304 by using the UTRAN 302. The SGSN 308 may contain subscriber and location information related to the user terminal 304.

The UTRAN 302 includes radio network sub-systems (RNS) 306A, 306B, each of which includes at least one radio network controller (RNC) 310A, 310B and nodes B 312A, 312B, 312C, 312D.

Some functions of the radio network controller 310A, 310B may be implemented with a digital signal processor, memory, and computer programs for executing computer processes. The basic structure and operation of the radio network controller 310A, 310B are known to one skilled in the art and only the details relevant to the present solution are discussed in detail.

The node B 312A, 312B, 312C, 312D implements the Uu interface, through which the user terminal 304 may access the network infrastructure. Some functions of the base station 312A, 312B, 312C, 312D may be implemented with a digital signal processor, memory, and computer programs for executing computer processes. The basic structure and operation of the base station 312A, 312B, 312C, 312D are known to one skilled in the art and only the details relevant to the present solution are discussed in detail.

Figure 1:
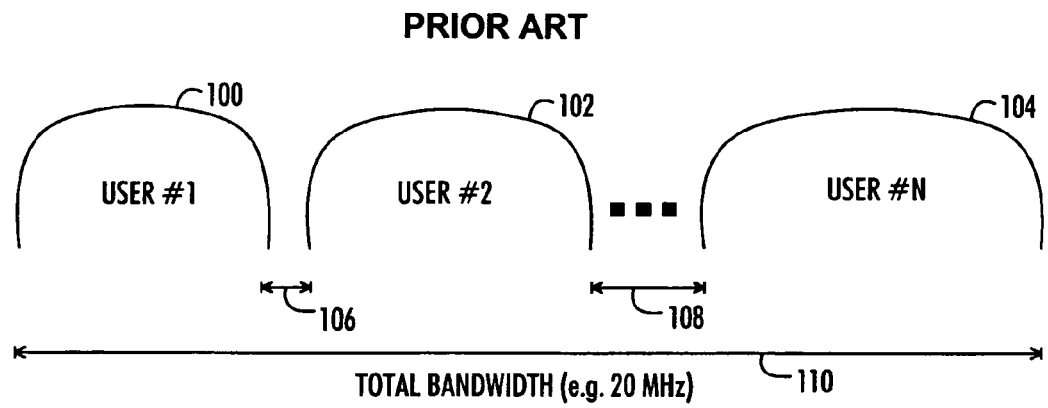
Figure 2:
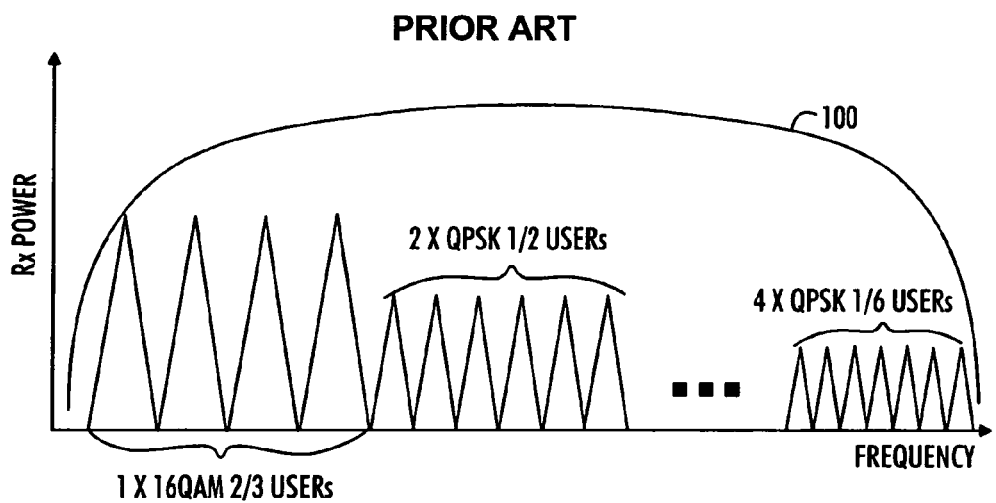
FIG. 2 illustrates another known way of spectrum utilization in FDMA/OFDMA systems.

The user terminal 304 may include two parts: mobile equipment (ME) 314 and a UMTS subscriber identity module (USIM) 316. The mobile equipment 314 typically includes radio frequency parts (RF) 318 for providing the Uu interface. The user terminal 304 further includes a digital signal processor 320, memory 322, and computer programs for executing computer processes. The user terminal 304 may further comprise an antenna, a user interface, and a battery not shown in FIG. 1. The USIM 316 comprises user-related information and information related to information security in particular, for instance, an encryption algorithm.

Figure 4:
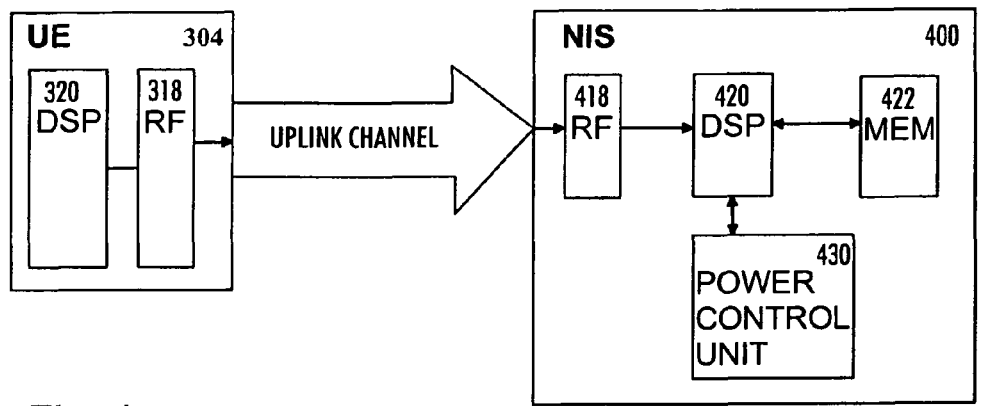
FIG. 4 shows another example of a wireless telecommunications system.

FIG. 4 shows another example of a wireless telecommunications system. The wireless telecommunications system comprises a network infrastructure (NIS) 400 and a user terminal (UE) 304. The user terminal 304 may be connected to the network infrastructure 400 over an uplink physical data channel, such as a DPDCH (Dedicated Physical Data channel) defined in the 3GPP specification.

An uplink control channel, such as an uplink DPCCH (Dedicated Physical Control Channel) defined in the 3GPP ($3^{rd}$ Generation Partnership Project) specification, transmitted by the user terminal 304 includes pilot sequences. The network infrastructure 400 encodes the pilot sequences and estimates signal quality parameters, such as SIR (Signal-to-Interference Ratio), of the uplink DPCCH.

The network infrastructure 400 generates power control commands on the basis of the signal quality parameters and transmits the power control commands to the user terminal 304 over a downlink control channel, such as a downlink DPCCH. The power control commands may be associated with an inner loop of a closed-loop power control protocol, for example.

The network infrastructure 400 comprises a transmitting/receiving unit 418, which carries out channel decoding of transmission signals, converts them from the baseband to the transmission frequency band and modulates and amplifies the transmission signals. The digital signal processing (DSP) unit 420 controls the operation of the network element and evaluates signals received via the transmitting/receiving unit 418. Data about the transmission and switching times and specific characteristics of the connections are stored in a memory 422.

In FIG. 4, only one user terminal 304 is shown. However, it is assumed that there are several user terminals 304 that share a common frequency band for communicating with the network infrastructure 400.

The network infrastructure 400 measures the signals in the uplink direction. The resource request from the user terminal 304 is thus recognized, for example by node B. The decision is made whether it is possible to allocate resources to the user terminal 304. If, for example, an adequate signal-to-noise ratio is detected, then the user terminal 304 is allocated a frequency band via an allocation channel.

In an embodiment, the radio resources allocation is carried out in the network infrastructure 400, such as a network element (e.g. node B). The processing unit 420 is configured to divide the common frequency band into more than one frequency band sub-block, and to allocate at least one user terminal 304 to each frequency band sub-block on the basis of the modulation and coding schemes used by the user terminals 304. The processing unit 420 is further configured to control transmission power of the user terminals on the basis of the modulation and coding schemes used by the user terminals.

Thus, the total frequency bandwidth is divided into several sub-blocks. For example, if the total bandwidth is 20 MHz, then the possible sizes of the sub-blocks can be multiples of the minimum block size, for example 480 KHz.

A data modulation scheme defines how the data bits are mixed with the carrier signal, which is always a sine wave. There are different ways to modulate a carrier signal in a digital sense: amplitude shift keying (ASK), frequency shift keying (FSK), and phase shift keying (PSK). The quadrature phase shift keying (QPSK) modulation has four phases. In the Uplink of current 3GPP systems using WCDMA techniques, pseudorandom codes are used to identify users and orthogonal codes to identify services of a user. However, in the upcoming systems, such as in 3.9G systems, frequency division multiple access techniques where users are separated into different frequency bands can be used. QAM (Quadrature Amplitude Modulation) is a modulation scheme in which two sinusoidal carriers are used to transmit data over a given physical channel. Because the orthogonal carriers occupy the same frequency band and differ by a 90 degree phase shift, each can be modulated independently, transmitted over the same frequency band, and separated by demodulation at the receiver.

In an embodiment, the network infrastructure 400 may first detect which modulation and coding scheme a given user terminal 304 is using and then allocate the given user terminal 304 into a given frequency band sub-block on the basis of the detected modulation and coding scheme. The user terminals 304 may, for example, inform the network infrastructure 400 about which modulation and coding schemes the user terminals 304 are going to use.

In another embodiment, a given user terminal 304 may have several alternative combinations of modulation and coding schemes that the user terminal 304 may use. The user terminal 304 may then inform the network infrastructure 400 about the different combinations via a control channel, for example. The network infrastructure 400 may then choose a given combination of the modulation and coding scheme alternatives to be used in a given frequency band sub-block. The network infrastructure 400 may then inform the user terminals 304 about the selected modulation and coding schemes that are to be used in given frequency band sub-blocks.

In an embodiment, the network infrastructure 400 may inform the user terminals 304 about a given modulation and coding scheme that is going to be used in a given frequency band sub-block. Thus, the network infrastructure 400 may, in fact, force the user terminals 304 to use a given modulation and coding scheme in certain frequency band sub-blocks.

In another embodiment, the user terminals 304 may have the knowledge about which modulation and coding scheme combinations can be used in given frequency band sub-blocks. The network infrastructure 400 may have provided this information to the user terminals 304 in advance.

Figure 5:
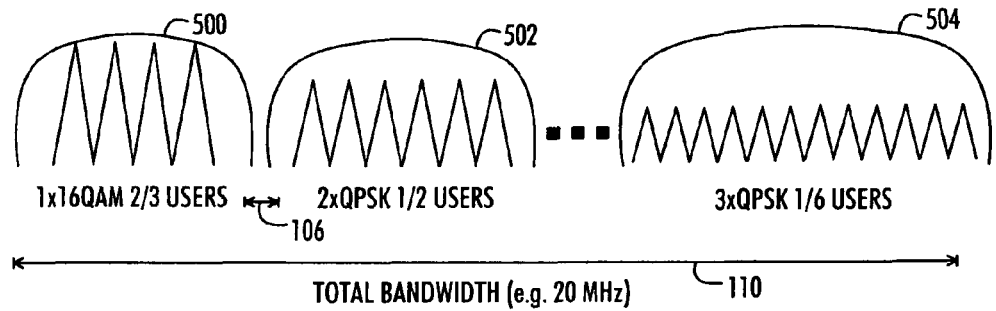
FIG. 5 illustrates an example of the method of controlling radio resources in an Uplink Frequency Division Multiple Access system.

FIG. 5 illustrates the principle of an embodiment of the invention that can be utilized in FDMA systems where one or more user terminals are allocated to different frequency band sub-blocks 500, 502, 504. The user terminals are allocated to different sub-blocks 500, 502, 504 according to the used modulation and coding schemes (MCS). The selection of the modulation and coding scheme can be based, for example, on traffic volume measurement and an achievable signal-to-interference-ratio. In an embodiment, the user terminals are allocated to the sub-blocks 500, 502, 504 such that the user terminals having the same or almost the same modulation and coding schemes are allocated to the same sub-blocks 500, 502, 504. The different sub-blocks 500, 502, 504 can be separated by using digital or analogue filters both in the transmitter and in the receiver side. Because the user terminals that have the same modulation and coding schemes have about the same required received power levels, the interference between the user terminals can be significantly reduced.

In an embodiment, the processing unit of FIG. 4 is further configured to detect received power levels of the user terminals, and to allocate user terminals with the same average received power levels to the same frequency band sub-block for minimizing Multiple Access Interference. The Multiple Access Interference can be minimized when the average received power level of the user terminals allocated to the same sub-block 500, 502, 504 is the same. In an embodiment, some additional power control methods are utilized in the user terminals inside the sub-blocks 500, 502, 504. The additional power control of the user terminals can be performed on the basis of the used modulation and coding schemes of the user terminals. The power control unit 430 in the network element 400 can be used to control the transmission power of the user terminals on the basis of the modulation and coding schemes used by the user terminals.

Figure 6:
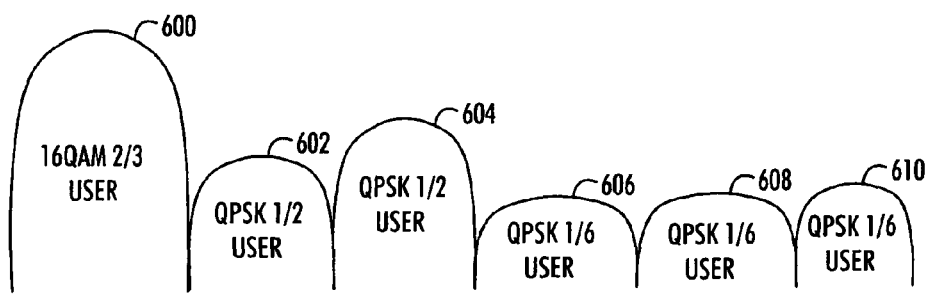
FIG. 6 illustrates another example of the method of controlling radio resources in an Uplink Frequency Division Multiple Access system.

FIG. 6 illustrates another example of an embodiment of the invention that is utilized in an SC-FDMA system where each user terminal is allocated to different sub-blocks 600, 602, 604, 606, 608, 610. In this embodiment, the user terminals are allocated to different sub-blocks 600, 602, 604, 606, 608, 610 according to the used modulation and coding schemes such that the users having the same modulation and coding schemes are allocated into the adjacent sub-blocks. For example, the user terminals in sub-blocks 606-610 each use QPSK ⅙ modulation and are thus allocated to adjacent sub-blocks 606-610. The user terminals in sub-blocks 602 and 604 use QPSK½ modulation and are thus also allocated to adjacent sub-blocks.

In an embodiment, such is also possible that one or more user terminals are allocated to a second frequency band sub-block on the basis of the modulation and coding schemes used by the user terminals when the frequency band sub-block to which the one or more user terminals were first allocated is frequency hopped. Thus, in a frequency hopping situation, the one or more user terminals may be allocated to a second frequency band sub-block that uses at least approximately similar modulation and coding scheme than the frequency band sub-block to which the one or more user terminals were first allocated. In an embodiment, in a frequency hopping situation, the modulation and coding scheme of the one or more user terminals may be changed to correspond the modulation and coding scheme of the second frequency band sub-block before allocating the one or more user terminals to the second frequency band sub-block. Frequency hopping enables diversity and the performance of the receiver is enhanced. Further, interference over the total frequency band can be averaged.

The embodiments of the invention can be used in both OFDMA and SC-FDMA systems. Further, both the interleaved and the blocked type of OFDMA can be used inside the sub-blocks. When using the interleaved type SC-FDMA, a low peak-to-average ratio can be used to produce a comb-shaped spectrum. The embodiments of the invention can be implemented by using normal radio frequency and baseband processing techniques.

Figure 7:
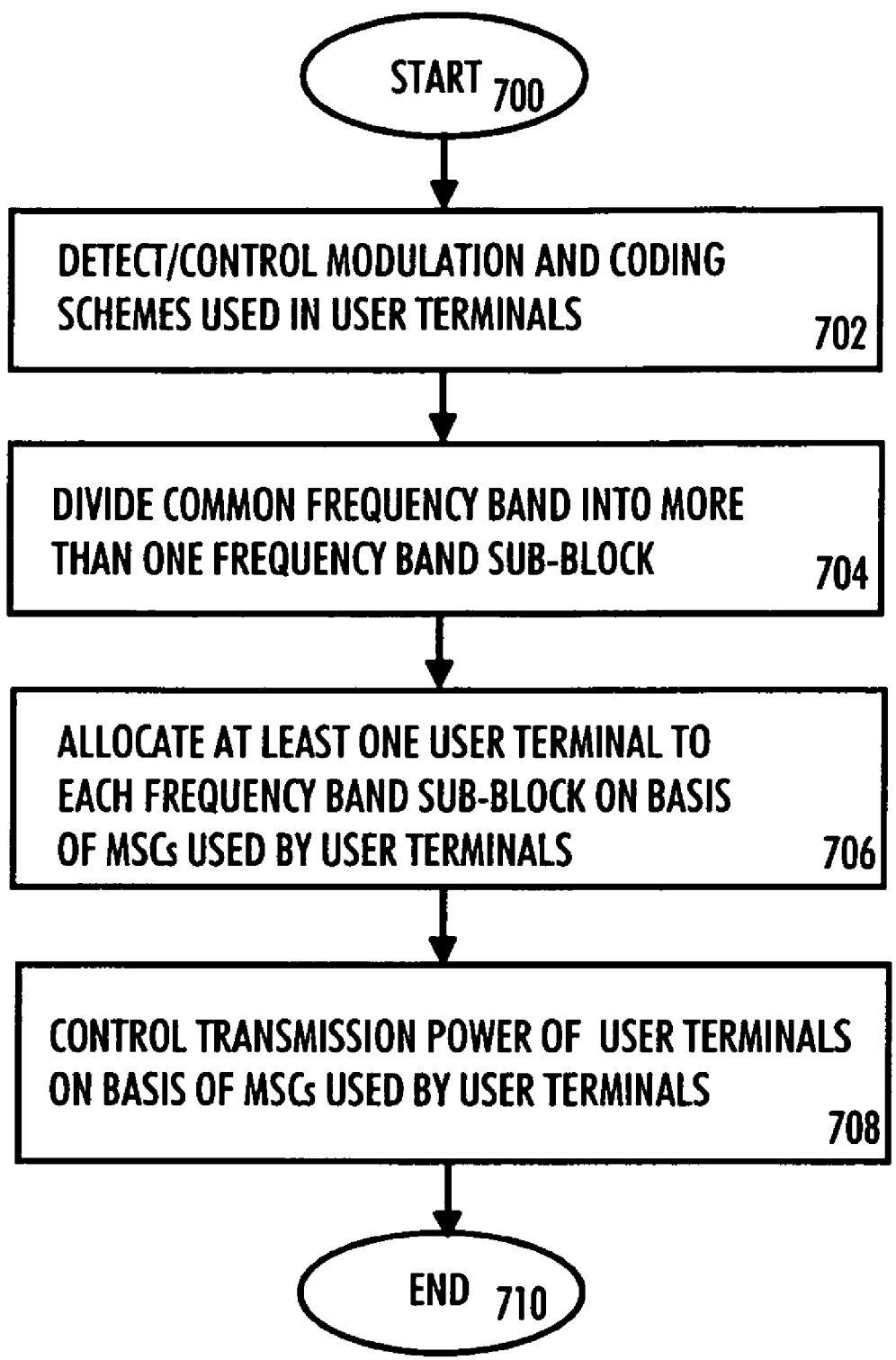
FIG. 7 illustrates another example of the method of controlling radio resources in an Uplink Frequency Division Multiple Access system.

With reference to FIG. 7, examples of methodology according to embodiments of the invention are shown in flow charts.

In FIG. 7, the method starts in 700. In 702, the modulation and coding schemes used in user terminals are detected or controlled. In 704, the common frequency band is divided into more than one frequency band sub-blocks. In 706, at least one user terminal is allocated to each frequency band sub-blocks on the basis of the modulation and coding schemes used by the user terminals. In 708, the transmission power of the user terminals is controlled on the basis of the modulation and coding schemes used by the user terminals.

The method ends in 710.

In an aspect, the invention provides a computer program product encoding a computer program of instructions for executing a computer process.

In another aspect, the invention provides a computer program distribution medium readable by a computer and encoding a computer program of instructions for executing a computer process.

The distribution medium may include a computer readable medium, a program storage medium, a record medium, a computer readable memory, a computer readable software distribution package, a computer readable signal, a computer readable telecommunications signal, and/or a computer readable compressed software package.

Embodiments of the computer process are shown and described in conjunction with FIG. 7.

The computer program may be executed in the digital signal processor 420 of the network element 400. Some process steps may be executed in the digital signal processor of the node B 312A to 312D. Some process steps may be executed, depending on the embodiment, in the digital signal processor of the radio network controller 310A, 310B.

Even though the invention has been disclosed above with reference to an example according to the accompanying drawings, it is clear that the invention is not restricted thereto but can be modified in several ways within the scope of the appended claims.

The invention claimed is:

1. A method, comprising:
    dividing a common frequency band into more than one frequency band sub-block;
    allocating user terminals that have approximately similar modulation and coding schemes to a frequency band sub-block of the common frequency band based on a respective average received power level for the user terminals, the average received power level being determined based on detected received power levels from the user terminals; and
    controlling transmission power of the at least one user terminal based on the modulation and coding schemes used by the user terminals.

2. The method of claim 1, further comprising:
    separating the different frequency band sub-blocks.

3. The method of claim 1, wherein the allocating the user terminals to respective frequency band sub-blocks further comprises:
    allocating user terminals with the same average received power levels to the same frequency band sub-block to minimize multiple access interference.

4. The method of claim 1, wherein the allocating the user terminals to respective frequency band sub-blocks further comprises:
    allocating user terminals having approximately similar modulation and coding schemes to adjacent frequency band sub-blocks.

5. The method of claim 1, the method further comprising:
    detecting which modulation and coding scheme a given user terminal uses; and
    allocating the given user terminal to a given frequency band sub-block based on the detected modulation and coding scheme.

6. The method of claim 1, the method further comprising:
    informing a network infrastructure about different combinations of modulation and coding schemes that are used by at least one of the user terminals, wherein the network infrastructure is configured to select a given combination of the modulation and coding schemes to be used in a given frequency band sub-block.

7. The method of claim 1, the method further comprising:
    causing the user terminals to be provided information about which modulation and coding scheme is used in a given frequency band sub-blocks by a network infrastructure.

8. The method of claim 1, the method further comprising:
    allocating at least one of the user terminals to a second frequency band sub-block based on the modulation and coding schemes used by the user terminals in an instance in which the frequency band sub-block to which the at least one of the user terminals was first allocated is frequency hopped.

9. The method of claim 8, wherein the second frequency band sub-block uses at least an approximately similar modulation and coding scheme than the frequency band sub-block to which the at least one of the user terminals was first allocated.

10. The method of claim 8, the method further comprising:
    changing the modulation and coding scheme of the at least one of the user terminals to correspond to the modulation and coding scheme of the second frequency band sub-block before allocating the at least one of the user terminals to the second frequency band sub-block.

11. The method of claim 1, wherein the common frequency band is in an uplink frequency division multiple access system, wherein the uplink frequency division multiple access system is a single carrier frequency division multiple access system or an orthogonal frequency division multiple access system.

12. A system, comprising:
    a network infrastructure;
    a plurality of user terminals; and
    an apparatus in the network infrastructure, the apparatus comprising at least one processor and at least one memory including computer program code, the at least one memory and the computer program code configured to, with the at least one processor, cause the apparatus at least to:
    divide a common frequency band used by the user terminals to communicate with the network infrastructure into more than one frequency band sub-block,
    allocate user terminals that have approximately similar modulation and coding schemes to a frequency band sub-block of the common frequency band based on a respective average received power level for the at least one user terminal, the average received power level being determined based on detected received power levels from the user terminals, and
    control transmission power of the user terminals based on the modulation and coding schemes used by the user terminals.

13. The system of claim 12, wherein the system further comprises:
    digital or analogue filters in the user terminals and in the network infrastructure configured to separate the different frequency band sub-blocks.

14. The system of claim 12, wherein the system is configured to support an uplink frequency division multiple access system, wherein the uplink frequency division multiple access system is a single carrier frequency division multiple access system or an orthogonal frequency division multiple access system.

15. An apparatus, comprising:
    a processor; and
    a memory including computer program code,
    the memory and the computer program code configured to, with the processor, cause the apparatus at least to:
    divide a common frequency band used by multiple user terminals to communicate with a network infrastructure into more than one frequency band sub-block,
    allocate user terminals that have approximately similar modulation and coding schemes to a frequency band sub-block of the common frequency band based on a respective average received power level for the at least one user terminal, the respective average received power level being determined based on detected received power levels from the user terminals, and
    control transmission power of the user terminals based on the modulation and coding schemes used by the user terminals.

16. The apparatus of claim 15, wherein the apparatus, further comprises:
    digital or analogue filters configured to separate different frequency band sub-blocks.

17. The apparatus of claim 15, wherein the apparatus is further caused to allocate the user terminals with identical average received power levels to the same frequency band sub-block to minimize multiple access interference.

18. The apparatus of claim 15, wherein the apparatus is further caused to allocate user terminals having approximately similar modulation and coding schemes to adjacent frequency band sub-blocks.

19. The apparatus of claim 15, wherein the apparatus is further caused to detect which modulation and coding scheme a given user terminal uses, and to allocate the given user terminal to a given frequency band sub-block based on the detected modulation and coding scheme.

20. The apparatus of claim 15, wherein the apparatus is further caused to receive information from a given user terminal about different combinations of modulation and coding schemes that are used by the given user terminal, and select a given combination of the modulation and coding scheme to be used in a given frequency band sub-block.

21. The apparatus of claim 15, wherein the apparatus is further directed to cause the user terminals to be provided information about which modulation and coding scheme is used in a given frequency band sub-blocks.

22. The apparatus of claim 15, wherein the apparatus is further caused to allocate at least one of the user terminals to a second frequency band sub-block based on the modulation and coding schemes used by the user terminals when the frequency band sub-block to which the at least one of the user terminals was first allocated is frequency hopped.

23. The apparatus of claim 22, wherein the second frequency band sub-block uses an approximately similar modulation and coding scheme than the frequency band sub-block to which the at least one of the user terminals was first allocated.

24. The apparatus of claim 22, wherein the apparatus is further caused to change the modulation and coding scheme of the at least one of the user terminals to correspond to the modulation and coding scheme of the second frequency band sub-block before allocating the at least one of the user terminals to the second frequency band sub-block.

25. An apparatus, comprising:
dividing means for dividing a common frequency band used by multiple user terminals to communicate with a network infrastructure into more than one frequency band sub-block;
radio resource allocation means for allocating user terminals that have approximately similar modulation and coding schemes to a frequency band sub-block of the common frequency band sub-block based on a respective average received power level for the at least one user terminal, the respective average received power level being determined based on detected received power levels from the user terminals; and
power control means for controlling transmission power of the user terminals based on the modulation and coding schemes used by the user terminals.

26. A computer-readable storage medium with instructions that, when executed on a computer, perform a process, the process comprising:
dividing a common frequency band into more than one frequency band sub-block;
allocating user terminals that have approximately similar modulation and coding schemes to a frequency band sub-block of the common frequency band based on a respective average received power level for the at least one user terminal, the respective average received power level being determined based on detected received power levels from the user terminals; and
controlling transmission power of the user terminals based on the modulation and coding schemes used by the user terminals.

27. A computer program distribution medium readable by a computer and encoding a computer program of instructions for executing a computer process, the process including:
dividing a common frequency band into more than one frequency band sub-block;
allocating user terminals that have approximately similar modulation and coding schemes to a frequency band sub-block of the common frequency band based on a respective average received power level for the at least one user terminal, the respective average power level being determined based on detected received power levels from the user terminals; and
controlling transmission power of the user terminals based on the modulation and coding schemes used by the user terminals.

28. The computer program distribution medium of claim 27, the distribution medium comprising a computer readable medium, a program storage medium, a record medium, a computer readable memory, a computer readable software distribution package, and a computer readable compressed software package.

* * * * *

UNITED STATES PATENT AND TRADEMARK OFFICE
CERTIFICATE OF CORRECTION

PATENT NO.         : 8,320,395 B2
APPLICATION NO.    : 11/396538
DATED              : November 27, 2012
INVENTOR(S)        : Pajukoski et al.

It is certified that error appears in the above-identified patent and that said Letters Patent is hereby corrected as shown below:

In the Specification:

Column 2,
Line 19, "(e.g. 16 QAM, effective code rate=$^2/_3$)" should read --(e.g. 16 QAM, effective code rate [ECR] = $^2/_3$)--.

Signed and Sealed this
Eleventh Day of June, 2013

Teresa Stanek Rea
*Acting Director of the United States Patent and Trademark Office*